Y. KAWAKITA.
SYSTEM OF ELECTRICALLY INDICATING ON BOARD SHIP THE DEPTH OF SEA WATER.
APPLICATION FILED JULY 5, 1918.
1,335,738. Patented Apr. 6, 1920.
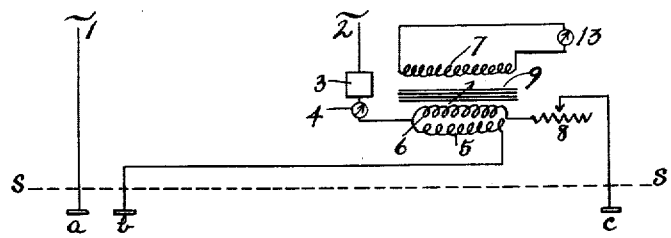
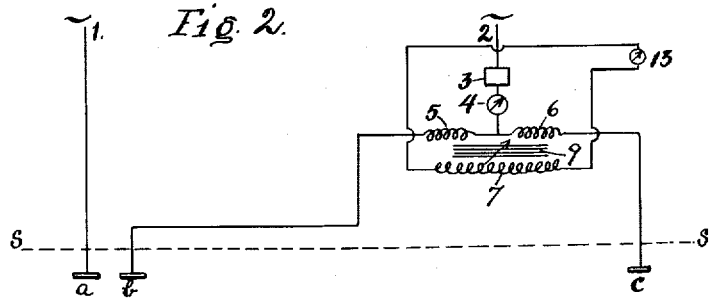
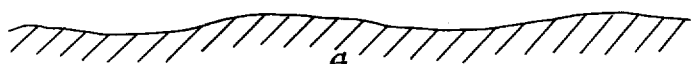
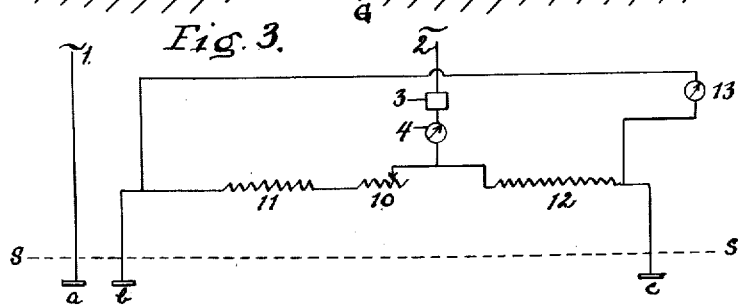
INVENTOR
BY Yoshinao Kawakita
Wm Wallace White
ATTORNEY

UNITED STATES PATENT OFFICE.

YOSHINAO KAWAKITA, OF HONGO-KU, TOKYO, JAPAN.

SYSTEM OF ELECTRICALLY INDICATING ON BOARD SHIP THE DEPTH OF SEA-WATER.

1,335,738. Specification of Letters Patent. Patented Apr. 6, 1920.

Application filed July 5, 1918. Serial No. 243,457.

*To all whom it may concern:*

Be it known that I, YOSHINAO KAWA-KITA, inventor, subject of the Emperor of Japan, residing at No. 176 Komagome-Hayashicho, Hongo-ku, Tokyo, Japan, have invented new and useful Improvements in Systems of Electrically Indicating on Board Ship the Depth of Sea-Water, of which the following is a specification.

This invention relates to a system in which two electric circuits, each including sea-water, and fed with an alternating current, are balanced in their effect when the ship is sailing in mid ocean, but become unbalanced when she comes near the shore owing to the influence of the ground beneath; and this unbalanced current is measured electrically by means of a sensitive dead beat galvanometer, which may be calibrated from known depths by fixing and adjusting other disturbing elements to be constant. The object of the invention is to replace the old clumsy method of throwing the lead by an automatic and continuous indication of the depth of sea water wherever a ship is sailing.

In the accompanying drawings, which illustrate the nature of my invention, Figure 1 shows the system of my invention employing a differential transformer and an adjustable resistance with which the two circuits including the sea-water are balanced; Fig. 2 is a modification thereof; and Fig. 3 is the system in which the same balancing is done by means of fixed and adjustable resistances.

Proceeding to the explanation of these drawings,— (*a*), (*b*), and (*c*) are three electrodes attached to the side of a ship, below sea-level (S) (S), of which (*a*) and (*b*) are placed very near to each other, while (*a*) and (*c*) are placed as far as possible from each other. In Figs. 1, 2, and 3, (1) and (2) are the electrodes of the system, to be connected to the source of an alternating current, of which the voltage and cycle are preferably kept constant. In the conductor connected to the terminal (2), that is to say near the part where the balancing adjustment is effected, there is placed an automatic current regulator (3) by means of which the total current supplied to the system from the source is kept constant, and a sensitive dead beat alternating current galvanometer 4 such as Weston's alternating current amperemeter indicates the constancy of this current. This automatic current regulator serves for keeping the feeding current constant and is constructed of a relay, a motor and a resistance or an impedance, in such a manner that an armature is placed at a certain distance from two poles of an electromagnet having a laminated iron core, such that while the feeding current is less than a certain value only one of the circuits is closed, yet when the same current becomes larger than that value, both of the circuits are thereby closed, and cause the motor to bring a sliding contact, to which a resistance or an impedance is attached, automatically to a proper position, according to the right or reverse rotation of the said motor. Such a device is actually employed in the well known Leeds and Northrup's potential recorders. From the galvanometer (4) the conductor branches to two primaries (5) and (6) of a differential transformer, of which the secondary is (7), in the case of Figs. 1 and 2. These primaries act oppositely on the secondary, and the balancing of their effect on the secondary is effected by moving the iron core (9) of the transformer, and also by an adjustable resistance (8), and the perfect balance is indicated by the zero-reading in the sensitive galvanometer (13), which closes the secondary (7). The primary (5) is joined to the electrode (*b*), and the primary (6) is joined to the electrode (*c*), through the adjustable resistance (8) in the case of Fig. 1. In the case of Fig. 3 the conductor leading from the galvanometer (4) branches into two circuits toward the electrodes (*b*) and (*c*), one through a fixed resistance (11) and an adjustable resistance (10), and the other through a fixed resistance (12); and the balancing of the two circuits is done by means of the adjustable resistance (10), and the balance is indicated by the zero-reading on the galvanometer (13), which is connected in shunt practically to the electrodes (*b*) and (*c*) themselves. In Figs. 1, 2, and 3, the galvanometer (13) may be a sensitive dead beat alternating current amperemeter to measure directly the alternating current, or the same may be a sensitive direct current dead beat milliamperemeter coupled with any well known rectifier or commutator which converts the alternating current into a direct current.

The working of the system is as below:— When a ship is in mid-ocean, where the sea-water may be considered to have an infinite depth, or, in other words, where the ground (G) beneath has no influence whatever upon the distribution of the lines of electric force between the electrodes (a) and (c), the alternating current which is fed to the system through the terminals (1) and (2) is made constant by means of the regulator (3), and then the currents in the primaries (5) and (6) are so adjusted by means of the resistance (8) and the core (9) as to cancel their effects on the secondary (7) as indicated by the zero-reading on the galvanometer (13) in the case respectively of Figs. 1 and 2, or by the resistance (10) so as to cancel their effect on the galvanometer (13) itself in the case of Fig. 3. Now when the ship approaches the shore, the ground (G) begins to have some influence on the distribution of electric lines of force between the electrodes (a) and (c), while leaving them undisturbed between the electrodes (a) and (b) on account of their proximity. On that account the apparent resistance between the electrodes (a) and (c) becomes larger and the balance at the differential transformer (Figs. 1 and 2) or on the galvanometer itself (Fig. 3) is disturbed, with the consequence that there is produced a current in the circuit including the galvanometer (13), which, being sensitive enough to indicate the amount of the disturbance, may serve to indicate the nearness of the ground, that is to say the depth of the sea-water. The galvanometer may be calibrated in fathoms from known depths of the sea.

A variation of resistance takes place between the electrodes $a$ and $c$ by the approach of the sea-bottom, but between $a$ and $b$ the current is always constant. The current flow from $a$ to $b$ is proportional to the content of salt in the sea water. If the electrode $a$ be omitted, and $b$ connected to $c$, the current would not be affected by the content of sea-water. Thus the omission of the electrode $a$ would mean a steady flow of current through $a$, 5, 4, 3, 2, and it would not be affected by the concentration of salt in the sea-water. Therefore the balancing of the two circuits, one containing 1, $a$, $c$, 8, 4, 3, 2, and the other containing 1, $b$, 5, 6, 4, 3, 2 would be impossible when the salt content varies. But by the use of two electrodes, $a$ and $b$, the ratio of two-current strength always remains the same, provided the sea depth is constant. Therefore two electrodes, $a$ and $b$, are indispensable when the salt content varies.

Having thus set forth the nature and the object of my invention, what I claim, and desire to secure by Letters Patent, is:—

1. A system of electrically indicating the depth of sea water, consisting of three electrodes attached to a side of a ship and placed at unequal distances below sea-level to form two branched circuits fed with an alternating current, an adjustable differential transformer, to which the said three electrodes are connected for balancing the effects of the currents in these two circuits on its secondary, a galvanometer in the secondary circuit of the said transformer for indicating the said balancing and also the amount of disturbance due to the changes of apparent resistance of sea-water between one pair of the said electrodes according to the proximity of the ground, and a current regulator in the feeding circuit of the said alternating current.

2. A system according to claim 1, in which one of the two balancing circuits contains an adjustable resistance for balancing the currents in the differential transformer.

3. A method of determining the varying depths of water below a floating ship, which consists in establishing a divided circuit, each branch of which includes the water adjacent the ship, the branch circuits being balanced electrically and inductively connected to an indicating instrument so that upon unbalancing the branch circuits the instrument will indicate such a condition and the extent thereof.

4. An apparatus for determining the varying depths of water beneath a floating ship, comprising an electrical circuit divided into two branches, each of which includes the water adjacent the ship, a primary in each of said branches, a resistance for controlling the current in one of said branches, a secondary common to both of the primaries, and an indicating instrument connected to the secondary.

5. An apparatus for determining the varying depths of water beneath a floating ship, comprising an electrical circuit including the water adjacent the ship, a differential transformer in said circuit, and indicating means operable by said transformer.

6. An apparatus for determining the varying depths of water beneath a floating ship, comprising an electrical circuit divided into two branches, each of which includes the water adjacent the ship, a differential transformer having the primaries thereof included in said branches, and resistances for varying the current in one primary to equal the current in the other primary, and an indicating instrument included in the circuit of the secondary of the transformer.

In testimony whereof I have signed my name to this specification.

YOSHINAO KAWAKITA.